(12) United States Patent
Suzuki et al.

(10) Patent No.: US 6,888,563 B2
(45) Date of Patent: May 3, 2005

(54) IMAGING SENSING APPARATUS (75) Inventors: Katsushi Suzuki, Tokyo (JP); Yoichi Kazama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 09/876,553

(22) Filed: Jun. 7, 2001

(65) Prior Publication Data

US 2002/0021354 A1 Feb. 21, 2002

(30) Foreign Application Priority Data

Jun. 7, 2000 (JP) ........................................ 2000-170630
Jun. 1, 2001 (JP) ........................................ 2001-166663

(51) Int. Cl.$^7$ ............................................. H04N 13/00
(52) U.S. Cl. ........................ 348/42; 348/51; 348/222.1
(58) Field of Search ............................ 348/42, 43, 51, 348/53, 75, 65, 48, 56, 220.1, 222.1

(56) References Cited

U.S. PATENT DOCUMENTS

| | | | | |
|---|---|---|---|---|
| 4,562,463 A | * | 12/1985 | Lipton | .......................... 348/56 |
| 5,142,357 A | * | 8/1992 | Lipton et al. | .................. 348/48 |
| 5,751,341 A | * | 5/1998 | Chaleki et al. | ................ 348/65 |
| 6,011,583 A | * | 1/2000 | Hieda et al. | .............. 348/220.1 |
| 6,195,125 B1 | * | 2/2001 | Udagawa et al. | ......... 348/222.1 |

\* cited by examiner

*Primary Examiner*—Gims Philippe
(74) *Attorney, Agent, or Firm*—Morgan & Finnegan, LLP (57) ABSTRACT

An image sensing apparatus capable of separately performing image processing on odd-numbered fields and even-numbered fields for each of the image data from the left lens and right lens when a 3-D (stereoscopic) compatible lens is mounted, and when a normal lens is mounted, recording image data while correlating fields and reducing redundant data. When 3-D compatible lens 1 is mounted to image sensing apparatus main body 12, the mounting of the lens is informed to the image sensing apparatus main body 12. In response, the image sensing apparatus main body 12 performs image processing separately on the left and right images for each field. For instance, the image compression mode is switched from an every-field structure to an alternate-field structure.

28 Claims, 7 Drawing Sheets

<MOUNT UNIT>

14 MOUNT UNIT

A  POWER SOURCE
B  VD
C  CLOCK
D  DATA ( FROM MAIN BODY )
E  DATA ( FROM LENS )
F  GROUND

13 CONNECTION TERMINAL

FIG. 3

< NORMAL LENS >

FIG. 4

<FIELD NUMBERS OF IMAGE SIGNAL>

FIELD

IMAGING SENSING APPARATUS

FIELD OF THE INVENTION

The present invention relates to an image sensing apparatus preferable to a case where a 3-D (stereoscopic) compatible lens is mounted.

BACKGROUND OF THE INVENTION

An image sensing apparatus capable of interchanging a lens has conventionally been available. The image sensing apparatus of this type can make communication between the lens and image sensing apparatus main body to receive information about characteristics of the lens or a present state and so on. For instance, the image sensing apparatus main body can identify by communication that a manual-focus-type lens is mounted.

The conventional 3-D (stereoscopic) compatible image sensing apparatus records images picked up by lenses for left and right images respectively. When the image is reproduced, the direction of a polarizing screen provided in the front surface of a television monitor is changed field by field. A viewer wears a pair of polarizing glasses having different configurations for the left and right so as to recognize left and right images separately.

However, the aforementioned conventional art has the following problem. More specifically, when an image is compressed by, for instance, the MPEG (Motion Picture Expert Group) method, correlations between the fields or frames are identified to ensure reduction of redundant data. Three data: I field having no data for preceding or succeeding frames, P field representing difference data between the preceding frame and present frame, and B field representing difference data between the preceding frame and succeeding frame, constitute one frame.

However, in the 3-D compatible image sensing apparatus, since left and right images are processed field by field as separate images, correlating consecutive fields decreases the effect of redundant data reduction.

SUMMARY OF THE INVENTION

The present invention has been proposed in view of the aforementioned problem, and has as its object to provide an image sensing apparatus capable of separately processing odd-numbered fields and even-numbered fields for each of the image data from the left lens and right lens when a 3-D (stereoscopic) compatible lens is mounted, and when a normal lens is mounted, recording image data while correlating fields and reducing redundant data.

According to the present invention, the foregoing object is attained by providing an image sensing apparatus comprising: a detection unit for detecting whether or not a stereoscopic compatible optical unit for stereoscopically sensing an optical image is mounted; a signal processing unit for performing signal processing on an image, sensed by an image sensing device, by employing a first signal processing method or a second signal processing method compatible to stereoscopic image sensing, which is different from the first signal processing method; and a control unit for switching from the first signal processing method to the second signal processing method for said signal processing unit when said detection unit detects that the stereoscopic compatible optical unit is mounted.

Furthermore, the present invention provides an image sensing system comprising: a stereoscopic compatible optical unit, capable of being mounted to or removed from an image sensing apparatus main body, for stereoscopically sensing an optical image; a detection unit for detecting whether or not said stereoscopic compatible optical unit is mounted; a signal processing unit for performing signal processing on an image, sensed by an image sensing device, by employing a first signal processing method or a second signal processing method compatible to stereoscopic image sensing, which is different from the first signal processing method; and a control unit for switching from the first signal processing method to the second signal processing method for said signal processing unit when said detection unit detects that the stereoscopic compatible optical unit is mounted.

Furthermore, the present invention provides a signal processing method comprising the steps of: detecting whether or not a stereoscopic compatible optical unit for stereoscopically sensing an optical image is mounted; when a detection unit detects that the stereoscopic compatible optical unit is mounted, switching from a first signal processing method to a second signal processing method for processing an image sensed by an image sensing device; and performing signal processing on the image, sensed by the image sensing device, by employing the second signal processing method.

Furthermore, the present invention provides a storage medium storing a signal processing method for executing the steps of: detecting whether or not a stereoscopic compatible optical unit for stereoscopically sensing an optical image is mounted; when a detection unit detects that the stereoscopic compatible optical unit is mounted, switching from a first signal processing method to a second signal processing method for processing an image sensed by an image sensing device; and performing signal processing on the image, sensed by the image sensing device, by employing the second signal processing method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
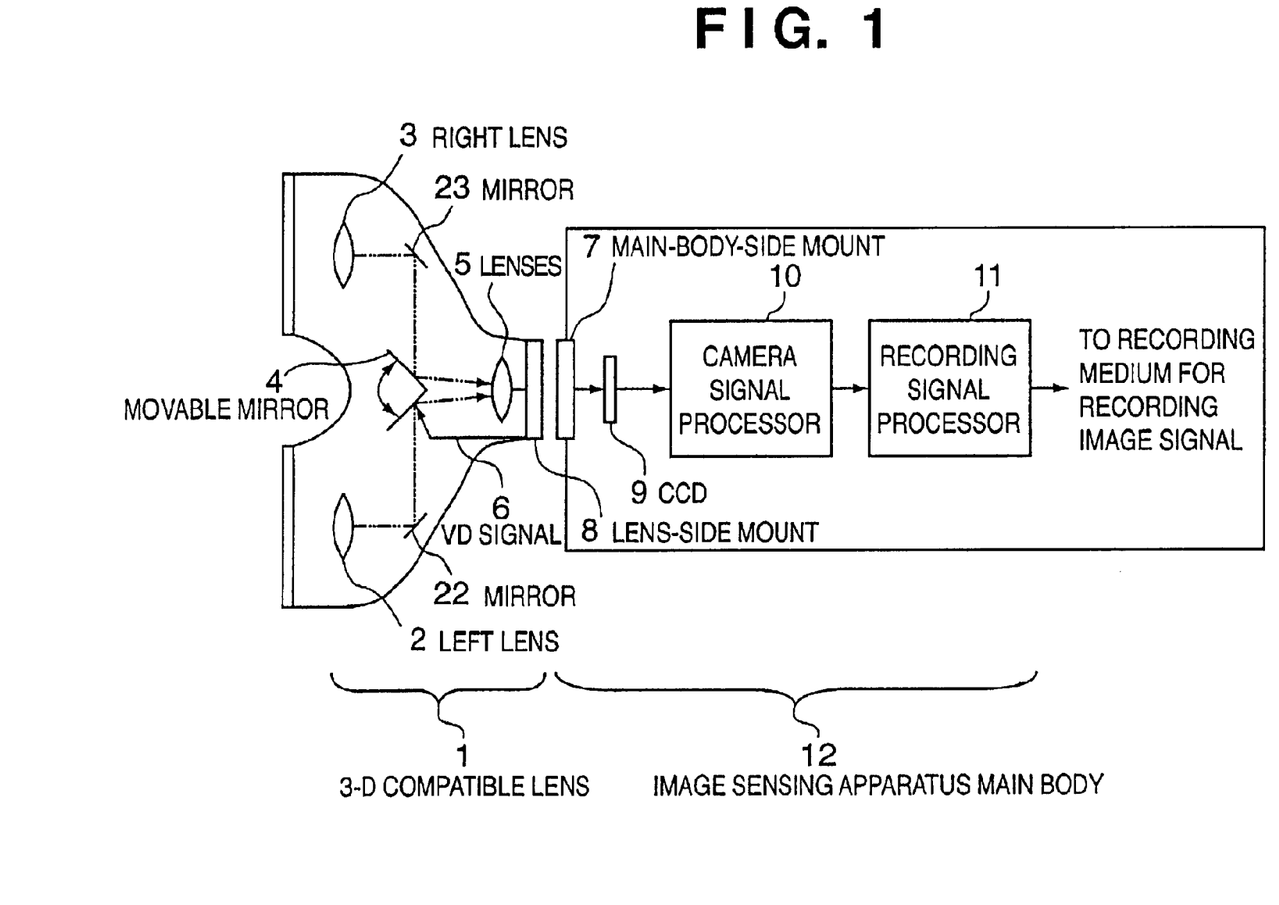
FIG. 1 is a block diagram showing an entire construction of an interchangeable-lens-type image sensing apparatus according to an embodiment of the present invention.

FIG. 1 is a block diagram showing an entire construction of an interchangeable-lens-type image sensing apparatus according to an embodiment of the present invention. The interchangeable-lens-type apparatus according to the embodiment of the present invention is roughly constructed with a 3-D compatible lens 1 and an image sensing apparatus main body 12. The 3-D compatible lens 1 comprises a left lens 2, a right lens 3, a movable mirror 4, lenses 5, a lens-side mount 8, and mirrors 22 and 23. The image sensing apparatus main body 12 comprises a main-body-side mount 7, an image sensing device (CCD) 9, a camera signal processor 10, and a recording signal processor 11. FIG. 1 shows the state where the 3-D compatible lens is mounted.

The aforementioned construction is now described along with their operations. The 3-D compatible lens 1 has a configuration where light transmitted through the left lens 2 and right lens 3 is switched by the movable mirror 4. This is one of the methods adopted by 3-D compatible lenses. The incident light from the left lens 2 and right lens 3 is alternately selected field by field by the movable mirror 4, and transmits through the lenses 5. The movable mirror 4 receives a vertical synchronizing (VD) signal 6 from the image sensing apparatus main body 12 through the connection terminals (13 of FIG. 2) of the main-body-side mount 7 and lens-side mount 8, thereby switching the signal field by field. The light transmitted through the lenses 5 is converted to an electric signal by the image sensing device (CCD) 9, then subjected to camera signal processing by the camera signal processor 10 and image signal processing by the recording signal processor 11, and recorded in a recording medium (not shown). A recording tape, disk, semiconductor memory may be used for the recording medium.

Figure 7:
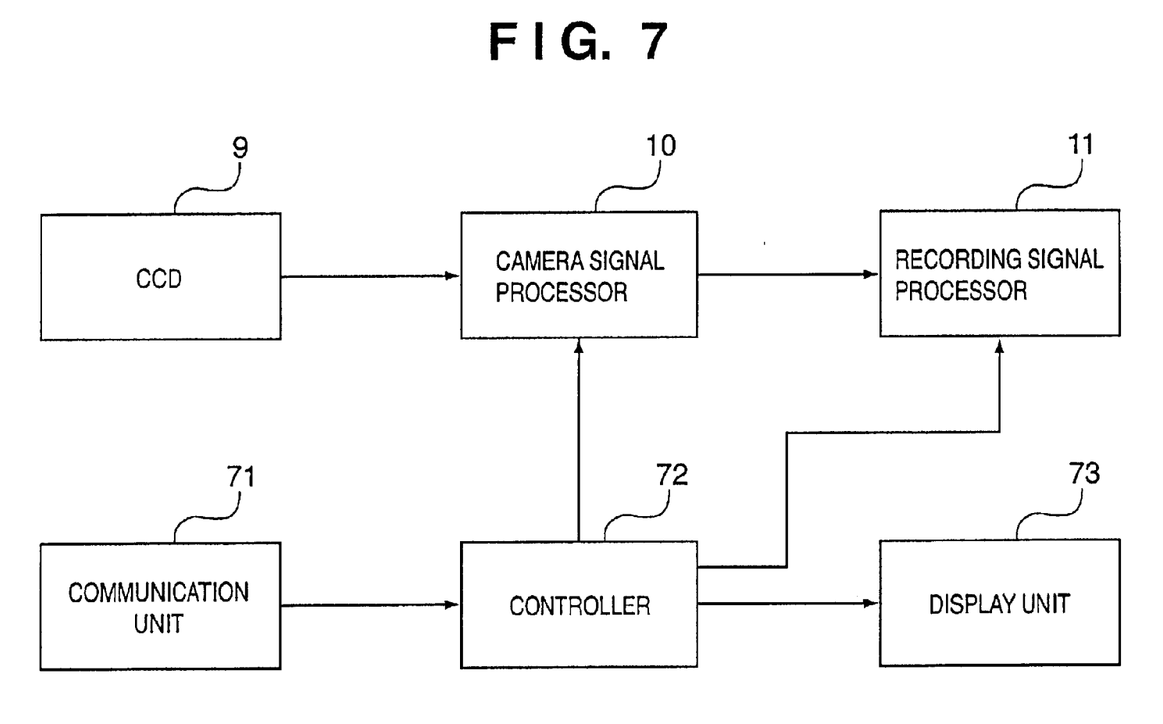
FIG. 7 is a block diagram showing a construction of the main part of the interchangeable-lens-type image sensing apparatus according to the embodiment of the present invention.

Furthermore, the image sensing apparatus according to the present embodiment is constructed such that mounting of the 3-D compatible lens 1 to the image sensing apparatus main body 12 is notified from the 3-D compatible lens 1 to the image sensing apparatus main body 12, and in response, the image sensing apparatus main body 12 commands 3-D compatible display to a display unit (FIG. 7).

FIG. 7 shows a construction of the main part of the interchangeable-lens-type image sensing apparatus according to the embodiment of the present invention shown in FIG. 1. The interchangeable-lens-type image sensing apparatus according to the embodiment of the present invention comprises the camera signal processor 10, recording signal processor 11, a communication unit 71 (each of the connection terminals of the main-body-side mount 7 and lens-side mount 8), a controller 72, and a display unit 73.

The camera signal processor 10 performs camera signal processing, which will be described later, based on the control of the controller 72. The recording signal processor 11 performs recording signal processing based on the control of the controller 72. The communication unit 71 notifies the image sensing apparatus main body when a 3-D compatible lens is mounted to the main body. The controller 72 performs controlling such that the image sensing apparatus main body alternately records left and right images field by field, and that a frame is changed from an every-field structure to an alternate-field structure. Also, the controller 72 performs controlling such that recording is performed while correlating fields and reducing redundant data, when a normal lens is mounted to the image sensing apparatus main body. The display unit 73 performs displaying when a 3-D compatible lens is mounted to the image sensing apparatus main body based on the control of the controller 72.

Figure 6:
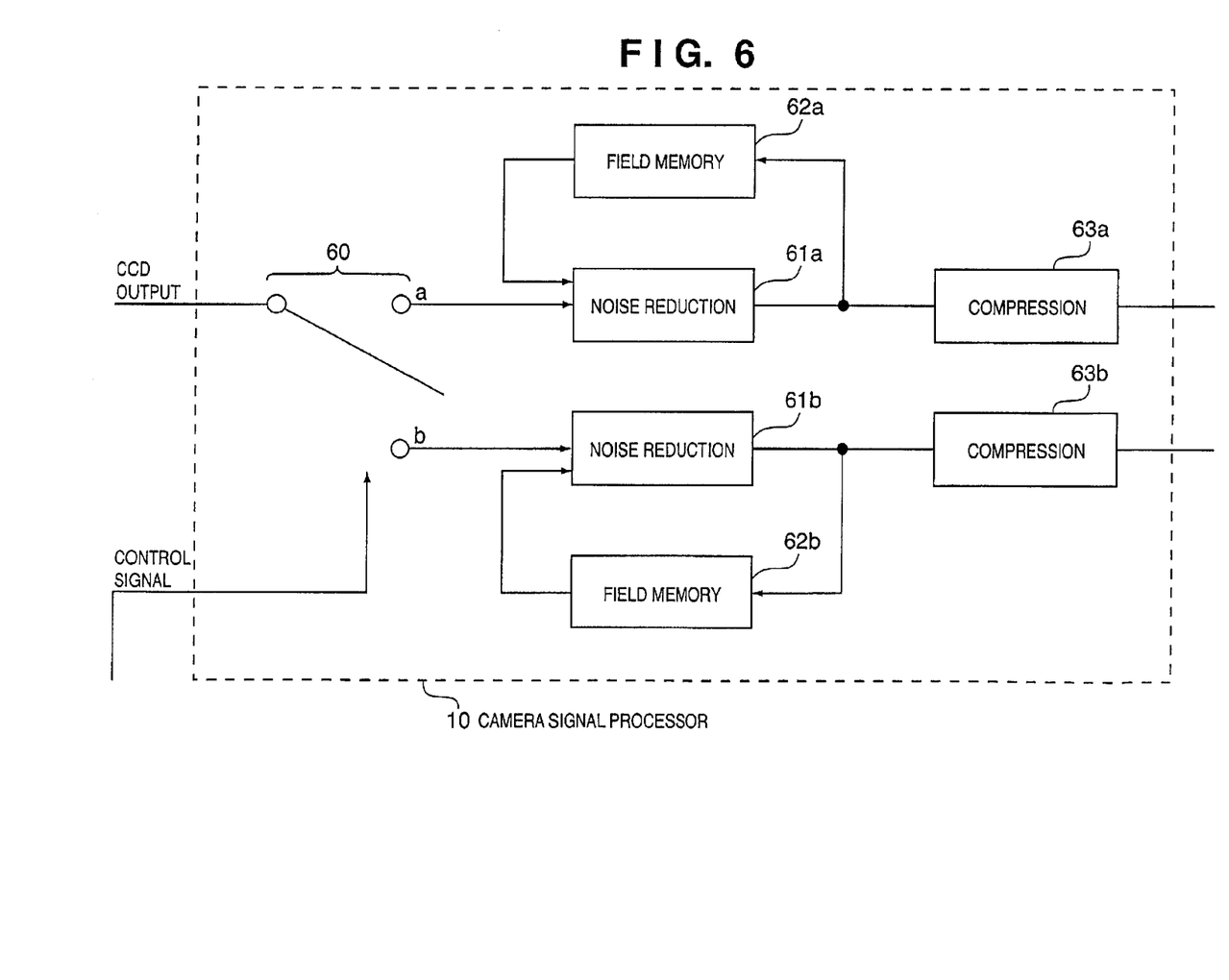
FIG. 6 is a block diagram showing a detailed construction of a camera signal processor 10 according to the embodiment of the present invention.

FIG. 6 is a block diagram showing a detailed construction of the camera signal processor 10.

As shown in FIG. 6, the camera signal processor 10 comprises a switch 60, noise reduction circuits 61a and 61b, field memories 62a and 62b, and compression circuits 63a and 63b.

Figure 3:
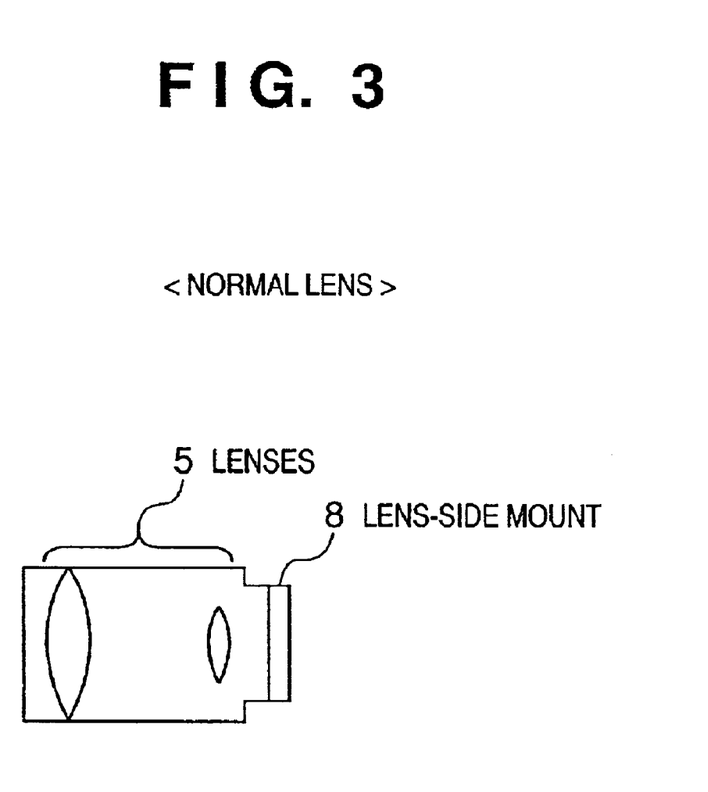
FIG. 3 is an explanatory view showing a structure of a normal lens, which is not a 3-D compatible lens, according to the embodiment of the present invention.

When it is detected that a normal lens such as that shown in FIG. 3 is mounted to the image sensing apparatus main body 12, the switch 60 is switched to contact a according to the control signal from the controller 72. On the other hand, when it is detected that a 3-D compatible lens is mounted to the image sensing apparatus main body 12, the switch 60 is alternately switched between contacts a and b for each field in synchronization with the vertical synchronizing signal 6 according to the control signal from the controller 72. In other words, the switch operation of the switch 60 is in synchronization with switching operation of the movable mirror 4 of the 3-D interchangeable lens.

The noise reduction circuits 61a and 61b are cyclic-type noise reduction-circuits provided respectively for reducing noise of image signals outputted from the filed memories 62a and 62b and an image signal outputted from the image sensing device 9.

Figure 2:
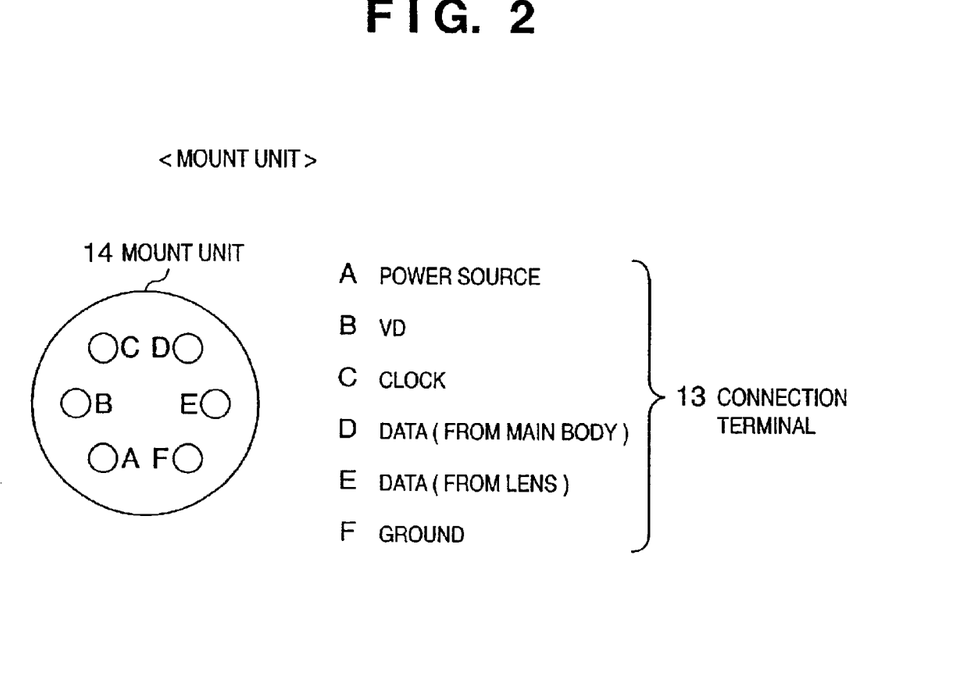
FIG. 2 is an explanatory view showing a structure of a mount unit of the interchangeable-lens-type image sensing apparatus according to the embodiment of the present invention.

FIG. 2 is an explanatory view showing a structure of the mount unit (main-body-side mount 7 and lens-side mount 8) of the interchangeable-lens-type image sensing apparatus according to the embodiment of the present invention shown in FIG. 1. The mount unit 14 comprises A, B, C, D, E and F connection terminals 13. The power source terminal A supplies power from the image sensing apparatus main body 12 to the 3-D compatible lens 1. The vertical synchronizing signal terminal B serves as a terminal for a switch signal of the movable mirror 4 or a chip select terminal for a microcomputer (not shown) of the 3-D compatible lens 1. The clock terminal C serves as a terminal useful for communication. The terminal D serves as a data line from the image sensing apparatus main body 12 to the 3-D compatible lens 1. The terminal E serves as a data line from the 3-D compatible lens 1 to the image sensing apparatus main body 12. The terminal F serves as a ground terminal.

The aforementioned power source terminal A supplies power to a motor or microcomputer of the 3-D compatible lens 1. It is assumed herein that communication is performed in serial communication, and becomes an active state by a chip select signal based on the VD signal 6. A serial clock signal is supplied from the image sensing apparatus main body 12, and communication is performed once every field in synchronization with the vertical synchronizing signal (VD) 6. Communication from the image sensing apparatus main body 12 to the 3-D compatible lens 1 or communication from the 3-D compatible lens 1 to the image sensing apparatus main body 12 both include initial communication and control communication.

In the initial communication immediately after a lens is mounted, focal length information or information related to lens characteristics, e.g., a focus function, zoom function, vibration isolation function, existence or absence of an ND filter and so on, is generally sent from the lens 1 to the image sensing apparatus main body 12. On the other hand, information identifying NTSC (National Television System Committee) or PAL (Phase Alternating by Line), or initial data for automatic focusing and so on is sent from the image sensing apparatus main body 12 to the 3-D compatible lens 1.

In the control communication for image sensing operation, information related to a current focal length, zooming direction, a value of an iris diaphragm, a value of the ND filter and so on is generally sent from the lens 1 to the image sensing apparatus main body 12. On the other hand, information related to current automatic exposure (AE) data, automatic focus data, data instructing a change in a value of focus, iris, or zoom and so on is sent from the image sensing apparatus main body 12 to the lens 1.

Generally communication is performed after the VD signal 6 of each field, and about 40 words are communicated in 1 to 2 msec. Information regarding a normal lens or 3-D compatible lens 1 is communicated from the lens 1 to the image sensing apparatus main body 12 as one of the initial data.

FIG. 3 is a brief view of a normal lens, which is not a 3-D compatible lens, according to the embodiment of the present invention. The normal lens does not include left and right lenses or a movable mirror for switching light transmitted through the lens. Furthermore, in the drawing, driving mechanisms such as focus, iris or zoom functions are omitted. When a normal lens of this type is mounted, initial communication and control communication are performed similarly to the case of 3-D compatible lens 1.

Figure 5:
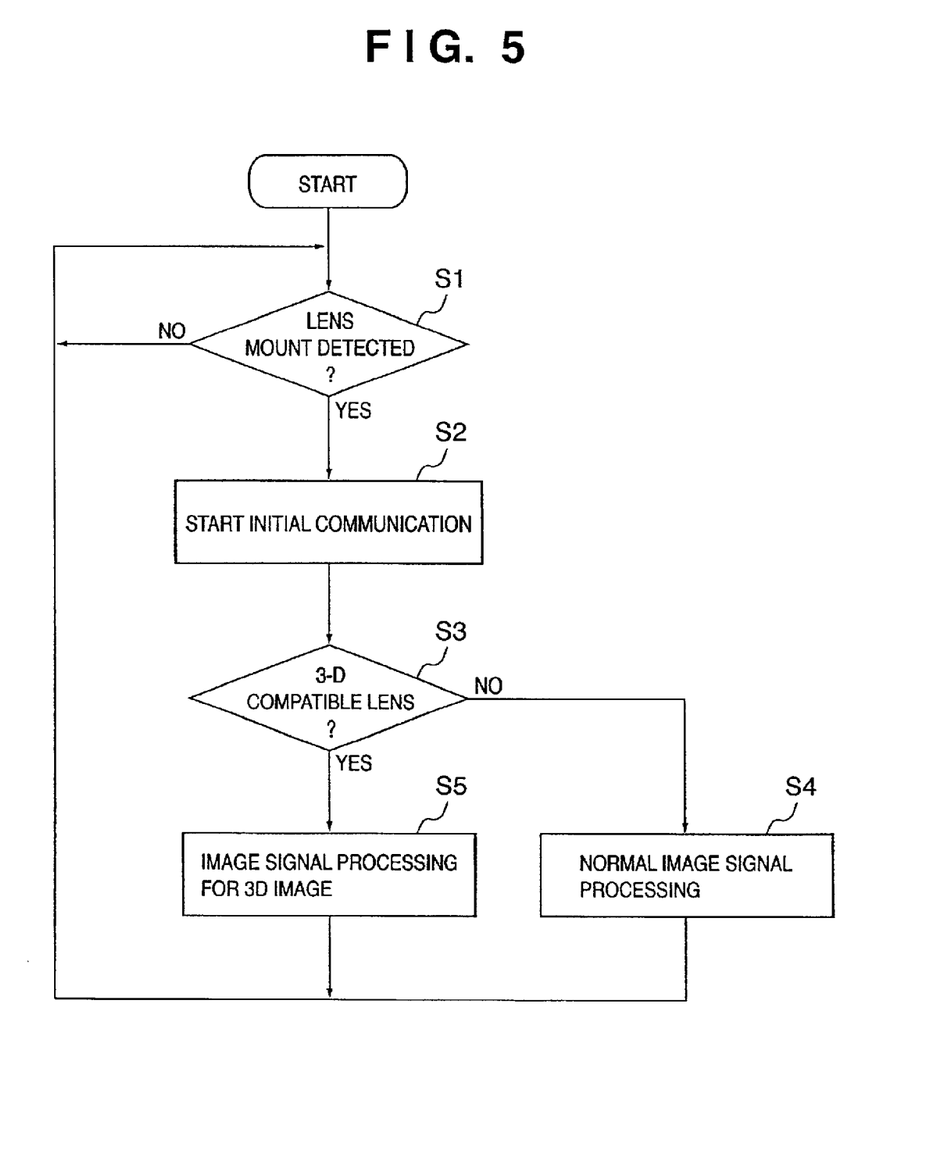
FIG. 5 is a flowchart explaining operation processing of a controller 72 according to the embodiment of the present invention.

FIG. 5 is a flowchart explaining operation processing of the controller 72.

In step S1, it is detected whether or not a lens is mounted to the main-body-side mount 7. When lens mount is detected, the control proceeds to step S2 where initial communication is made with the mounted lens through the communication unit 71 for obtaining aforementioned information about the lens.

In step S3, determination is made as to whether or not the mounted lens is the 3-D compatible lens 1 or a normal lens shown in FIG. 3 based on the information obtained in the initial communication in step S2. When it is determined that the normal lens shown in FIG. 3 is mounted, the control proceeds to step S4 for executing normal image signal processing by the camera signal processor 10. Meanwhile, when it is determined that the 3-D compatible lens 1 is mounted, the control proceeds to step S5 for executing 3-D image signal processing, which will be described later, by the camera signal processor 10.

Figure 4:
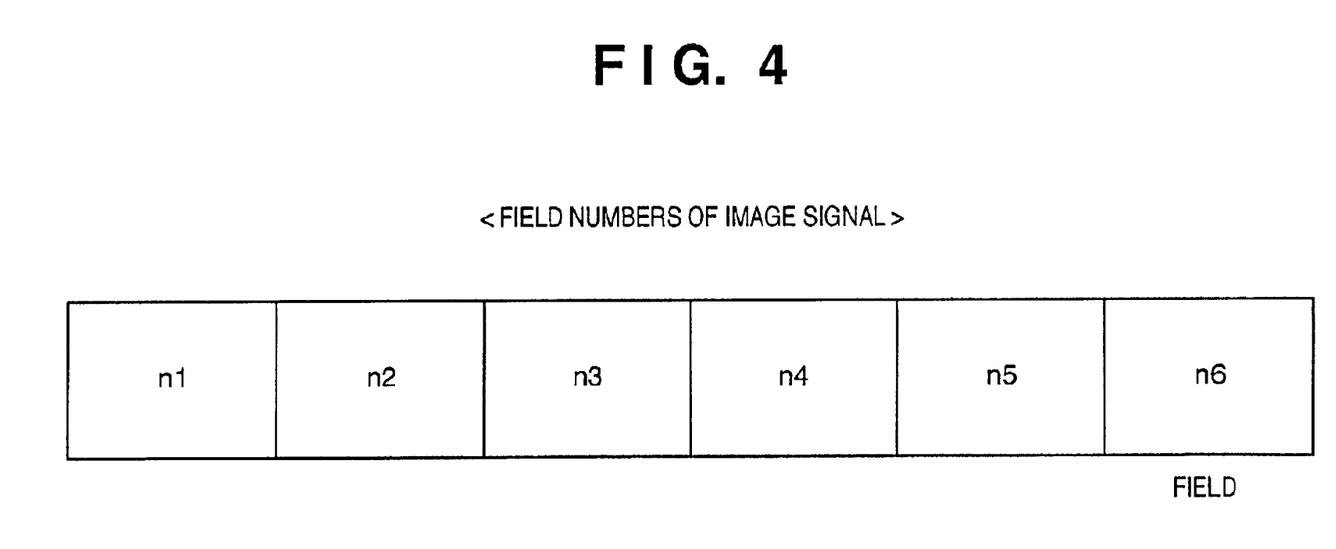
FIG. 4 is an explanatory view showing field numbers of an image signal in the interchangeable-lens-type image sensing apparatus according to the embodiment of the present invention.

FIG. 4 is a view showing field numbers of an image signal in the interchangeable-lens-type image sensing apparatus according to the embodiment of the present invention shown in FIG. 1. Processing of the camera signal processor 10 is described with reference to FIG. 4. First, step S4 in FIG. 5 is described. When a normal lens is mounted, interlace scanning (a scanning method employed in a raster-scan-type display) is performed in the combination of n1 and n2, n3 and n4, and n5 and n6, and each combination constructs one frame of image. Since the switch 60 (FIG. 6) is connected to the contact a, the noise reduction circuit 61a performs noise reduction processing by using an image signal of the n(k)th field outputted from the image sensing device (CCD) 9 and an image signal of the n(k−1)th field (preceding field of n(k)th field) outputted from the field memory 62a. The compression circuit 63a performs predictive coding among the fields and reduces redundant data.

An example of predictive coding is given for a case where a normal lens, not a 3-D compatible lens, is mounted.

first frame: data for n1 second frame: difference data between n2 and n1 third frame: difference data between n3 and n1, n3 and n2, n3 and n5, and n3 and n6 fourth frame: difference data between n4 and n1, n4 and n2, n4 and n5, and n4 and n6 fifth frame: difference data between n5 and n1, and n5 and n2 sixth frame: difference data between n6 and n2, and n6 and n5

Compression processing is performed in the foregoing manner.

Next, a description is provided on the processing of the camera signal processor 10 in a case where mounting of a 3-D compatible lens 1 is detected. In the 3-D compatible lens 1, image data from the left and right lenses is alternately inputted field by field to the image sensing device (CCD) 9.

As mentioned above, when mounting of a 3-D compatible lens 1 is detected, the switch 60 is alternately switched between contacts a and b for each field in synchronization with the vertical synchronizing signal 6. Therefore, for instance, when image data inputted from the left lens is image data for odd-numbered fields (n1, n3, n5), the image data from the left lens is processed by the noise reduction circuit 61a and compression circuit 63a. On the other hand, when image data inputted from the right lens is image data for even-numbered fields (n2, n4, n6), the image data from the right lens is processed by the noise reduction circuit 61b and compression circuit 63b.

More specifically, the noise reduction circuit 61a performs noise reduction processing by using an image signal of the n(2k)th field outputted from the image sensing device 9 and an image signal of the n(2k−2)th field outputted from the field memory 62a. Meanwhile, the noise reduction circuit 61b performs noise reduction processing by using an image signal of the n(2k+1)th field outputted from the image sensing device 9 and an image signal of the n(2k−1)th field outputted from the field memory 62b.

An example of predictive coding is given below for a case where a 3-D compatible lens 1 is mounted.

first frame: data for n1 second frame: data for n2 third frame: difference data between n3 and n1, and n3 and n5 fourth frame: difference data between n4 and n2, and n4 and n6 fifth frame: difference data between n5 and n1 sixth frame: difference data between n6 and n2

The processing for the first, third and fifth frames is performed by the compression circuit 63a while processing for the second, fourth and sixth frames is performed by the compression circuit 63b.

As described above, since data from the left lens and right lens is separately subjected to compression processing, redundant data reduction can efficiently be performed.

As has been set forth above, according to the embodiment of the present invention, the interchangeable-lens-type image sensing apparatus is constructed such that the 3-D compatible lens 1 informs the image sensing apparatus main body 12 when a 3-D (stereoscopic) compatible lens is mounted. In response, the image sensing apparatus main body 12 switches the image compression mode from the every-field structure to the alternate-field structure.

Accordingly, when the 3-D compatible lens 1 is mounted to the image sensing apparatus main body 12, left and right images can be processed appropriately as separate images in alternate fields.

In other words, the embodiment of the present invention is effective in a way that data from the left lens and data from the right lens can be processed separately for the odd-numbered fields and even-numbered fields. Furthermore, the present embodiment is effective in that processing can be performed while correlating fields and reducing redundant data, when a normal lens is mounted to the image sensing apparatus main body.

Furthermore, when mounting of the 3-D compatible lens 1 to the image sensing apparatus main body 12 is communicated from the 3-D compatible lens 1 to the image sensing apparatus main body 12, the image sensing apparatus main body 12 commands the display unit 73 to perform 3-D displaying. By virtue of this, an operator can easily distinguish a 3-D compatible lens from a normal lens without misconception.

[Other Embodiments]

Although the above-described embodiment of the present invention provides an example of an interchangeable-lens-type image sensing apparatus as a single unit, the present invention is not limited to this. For instance, the present invention is applicable to a system where an interchangeable-lens-type image sensing apparatus is connected to a personal computer or the like.

Note in the above-described embodiment, the description has been provided assuming that the scanning method employed by the CCD 9 is an interlace scanning method. However, the present invention is applicable also to a progressive scanning method where data for all pixels is read at once. In this case, the switch 60 of the camera signal processor 10 is switched for each frame.

The present invention can be applied to a system constituted by a plurality of devices or to an apparatus comprising a single device. Further, the object of the present invention can also be achieved by providing a storage medium storing program codes of a software for realizing the aforesaid functions to a computer system or apparatus, reading the program codes, by a CPU or MPU of the computer system or apparatus, from the storage medium, then executing the program.

In this case, the program codes read from the storage medium realize the functions according to the embodiment, and the storage medium storing the program codes constitutes the invention. For providing the program codes, a storage medium, such as a floppy disk, a hard disk, an optical disk, a magneto-optical disk, CD-ROM, CD-R, a magnetic tape, a non-volatile type memory card, and ROM can be used, or downloading can be performed.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:
   a detection unit for detecting whether or not a stereoscopic compatible optical unit for stereoscopically sensing an optical image is mounted;
   a signal processing unit for performing signal processing on an image, sensed by an image sensing device, by employing a first signal processing method or a second signal processing method compatible to stereoscopic image sensing, which is different from the first signal processing method; and
   a control unit for switching from the first signal processing method to the second signal processing method for said signal processing unit when said detection unit detects that the stereoscopic compatible optical unit is mounted.

2. The image sensing apparatus according to claim 1, wherein said stereoscopic compatible optical unit comprises left and right optical lenses for alternately inputting left and right optical images field by field to the image sensing device.

3. The image sensing apparatus according to claim 2, wherein in the second signal processing method, said signal processing unit performs signal processing based on the image obtained in every other field.

4. The image sensing apparatus according to claim 1, wherein said stereoscopic compatible optical unit comprises left and right optical lenses, and
   in the second signal processing method of said signal processing unit, signal processing is performed separately for an image from the left optical lens and an image from the right optical lens.

5. The image sensing apparatus according to claim 1, wherein in the first signal processing method, said signal processing unit performs signal processing based on a temporally adjacent image.

6. The image sensing apparatus according to claim 1, wherein said signal processing unit includes a compression processing unit for performing compression processing on an image.

7. The image sensing apparatus according to claim 1, wherein said signal processing unit includes a cyclic-type noise reduction processing unit for reducing noise of an image.

8. An image sensing system comprising:
   a stereoscopic compatible optical unit, capable of being mounted to or removed from an image sensing apparatus main body, for stereoscopically sensing an optical image;
   a detection unit for detecting whether or not said stereoscopic compatible optical unit is mounted;
   a signal processing unit for performing signal processing on an image, sensed by an image sensing device, by employing a first signal processing method or a second signal processing method compatible to stereoscopic image sensing, which is different from the first signal processing method; and
   a control unit for switching from the first signal processing method to the second signal processing method for said signal processing unit when said detection unit detects that the stereoscopic compatible optical unit is mounted.

9. The image sensing system according to claim 8, wherein said stereoscopic compatible optical unit comprises left and right optical lenses for alternately inputting left and right optical images field by field to the image sensing device.

10. The image sensing system according to claim 9, wherein in the second signal processing method, said signal processing unit performs signal processing based on the image obtained in every other field.

11. The image sensing system according to claim 8, wherein said stereoscopic compatible optical unit comprises left and right optical lenses, and
   in the second signal processing method of said signal processing unit, signal processing is performed separately for an image from the left optical lens and an image from the right optical lens.

12. The image sensing system according to claim 8, wherein the first signal processing method, said signal processing unit performs signal processing based on a temporally adjacent image.

13. The image sensing system according to claim 8, wherein said signal processing unit includes a compression processing unit for performing compression processing on an image.

14. The image sensing system according to claim 8, wherein said signal processing unit includes a cyclic-type noise reduction processing unit for reducing noise of an image.

15. A signal processing method comprising the steps of:
   detecting whether or not a stereoscopic compatible optical unit for stereoscopic sensing an optical image is mounted;
   when a detection unit detects that the stereoscopic compatible unit is mounted, switching from a first signal processing method to a second signal processing method for processing an image sensed by an image sensing device; and
   performing signal processing on an image, sensed by an image sensing device, by employing the second signal processing method.

16. The signal processing method according to claim 15, wherein the stereoscopic compatible optical unit comprises left and right optical lenses for alternately inputting left and right optical images field by field to the image sensing device.

17. The signal processing method according to claim 16, wherein in the second signal processing method, signal processing is performed based on the image obtained in every other field.

18. The signal processing method according to claim 15, wherein the stereoscopic compatible optical unit comprises left and right optical lenses, and
   in the second signal processing method, signal processing is performed separately for an image from the left optical lens and an image from the right optical lens.

19. The signal processing method according to claim 15, wherein in the first signal processing method, signal processing is performed based on a temporally adjacent image.

20. The signal processing method according to claim 15, wherein the signal processing method includes an image compression processing method.

21. The signal processing method according to claim 15, wherein said signal processing method includes a cyclic-type noise reduction processing method for reducing noise of an image.

22. A storage medium storing a signal processing method for executing the steps of:
   detecting whether or not a stereoscopic compatible optical unit for stereoscopic sensing an optical image is mounted;
   when a detection unit detects that the stereoscopic compatible unit is mounted, switching from a first signal processing method to a second signal processing method for processing an image sensed by an image sensing device; and
   performing signal processing on an image, sensed by an image sensing device, by employing the second signal processing method.

23. The storage medium according to claim 22, wherein the stereoscopic compatible optical unit comprises left and right optical lenses for alternately inputting left and right optical images field by field to the image sensing device.

24. The storage medium according to claim 23, wherein in the second signal processing method, signal processing is performed based on the image obtained in every other field.

25. The storage medium according to claim 22, wherein the stereoscopic compatible optical unit comprises left and right optical lenses, and
   in the second signal processing method, signal processing is performed separately for an image from the left optical lens and an image from the right optical lens.

26. The storage medium according to claim 22, wherein in the first signal processing method, signal processing is performed based on a temporally adjacent image.

27. The storage medium according to claim 22, wherein the signal processing method includes an image compression processing method.

28. The storage medium according to claim 22, wherein the signal processing method includes a cyclic-type noise reduction processing method for reducing noise of an image.

* * * * *

UNITED STATES PATENT AND TRADEMARK OFFICE
CERTIFICATE OF CORRECTION

PATENT NO. : 6,888,563 B2
DATED : May 3, 2005
INVENTOR(S) : Suzuki et al.

It is certified that error appears in the above-identified patent and that said Letters Patent is hereby corrected as shown below:

<u>Title page, Item [54] and Column 1, line 1,</u>
Title, change "IMAGING SENSING APPARATUS" to -- IMAGE SENSING APPARATUS --;

<u>Column 4,</u>
Line 18, change "contact a according", to -- contact "a" according. --;
Line 29, change "reduction-circuits" to -- reduction circuits --; and <u>Column 8,</u>
Line 31, change "based on the" to -- based on an --.

Signed and Sealed this

First Day of November, 2005

JON W. DUDAS
*Director of the United States Patent and Trademark Office*